United States Patent [19]
Platte et al.

[11] Patent Number: 4,728,949
[45] Date of Patent: Mar. 1, 1988

[54] REMOTE CONTROL DEVICE FOR CONTROLLING VARIOUS FUNCTIONS OF ONE OR MORE APPLIANCES

[75] Inventors: Hans-Joachim Platte, Hemmingen; Günter Oberjatzas, Hanover; Walter Vössing, Wenningsen, all of Fed. Rep. of Germany

[73] Assignee: Telefunken Fernseh und Rundfunk GmbH, Hanover, Fed. Rep. of Germany

[21] Appl. No.: 592,798

[22] Filed: Mar. 23, 1984

[30] Foreign Application Priority Data

Mar. 23, 1983 [DE] Fed. Rep. of Germany ....... 3310580
Sep. 14, 1983 [DE] Fed. Rep. of Germany ....... 3333081

[51] Int. Cl.⁴ ............................................. H04Q 1/00
[52] U.S. Cl. ........................... 340/825.37; 340/825.69
[58] Field of Search ............ 340/696, 365 S, 365 VL, 340/825.36, 825.37, 825.69, 348, 825.72

[56] References Cited

U.S. PATENT DOCUMENTS

| | | |
|---|---|---|
| 3,956,745 | 5/1976 | Ellis .................................. 340/365 S |
| 4,014,016 | 3/1977 | Sherritt et al. .................. 340/365 S |
| 4,185,272 | 1/1980 | Feiker .............................. 340/825.07 |
| 4,214,229 | 7/1980 | Warner ........................... 340/825.37 |
| 4,418,333 | 11/1983 | Schwarzbach et al. ... 340/825.07 X |
| 4,425,627 | 1/1984 | Eibner ........................... 340/365 VL |
| 4,431,988 | 2/1984 | Molusis et al. ............... 340/365 VL |
| 4,462,022 | 7/1984 | Stolarczyk .................. 340/825.06 X |
| 4,481,587 | 11/1984 | Daniels ......................... 340/365 VL |

Primary Examiner—Ulysses Weldon
Attorney, Agent, or Firm—Spencer & Frank

[57] ABSTRACT

A remote control unit, particularly for a television receiver or a video tape recorder, having a limited number of keys which have different functions that are identified by lettering presented on display elements corresponding to the keys, depending upon which appliance is selected for control. The remote control unit employs a microprocessor which cooperates with plug-in memories for the various appliances, the memories defining the key usages and corresponding lettering, etc. The remote control unit includes an additional display element for providing brief instructions to the user or displaying information received from the controlled appliance via a return channel.

11 Claims, 9 Drawing Figures

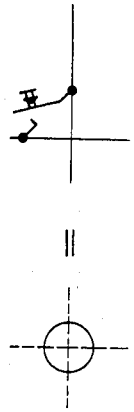
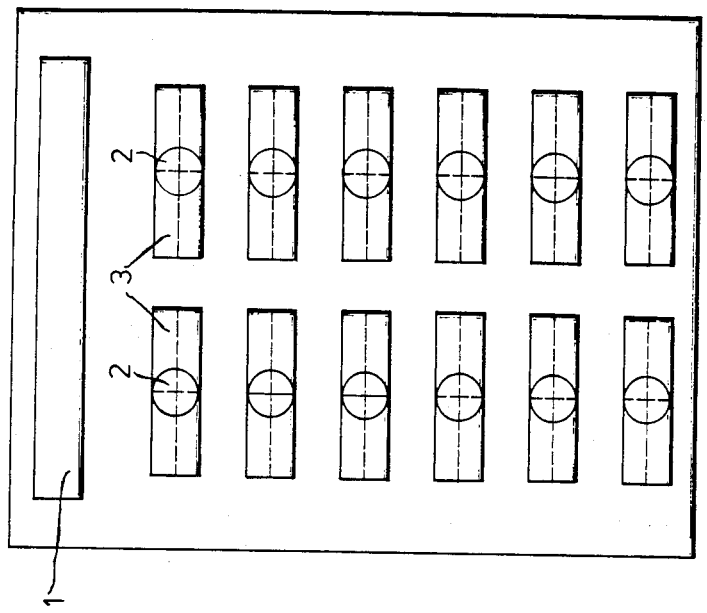
FIG.2A
FIG.2B
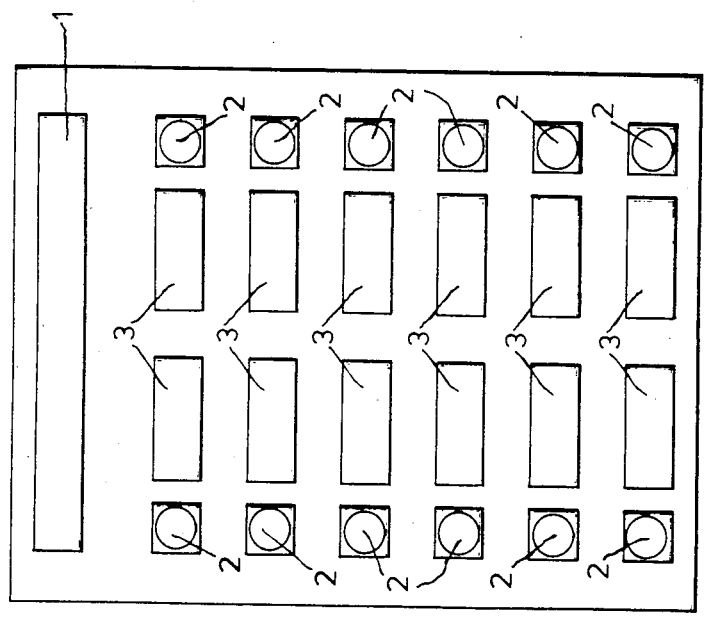
FIG.1

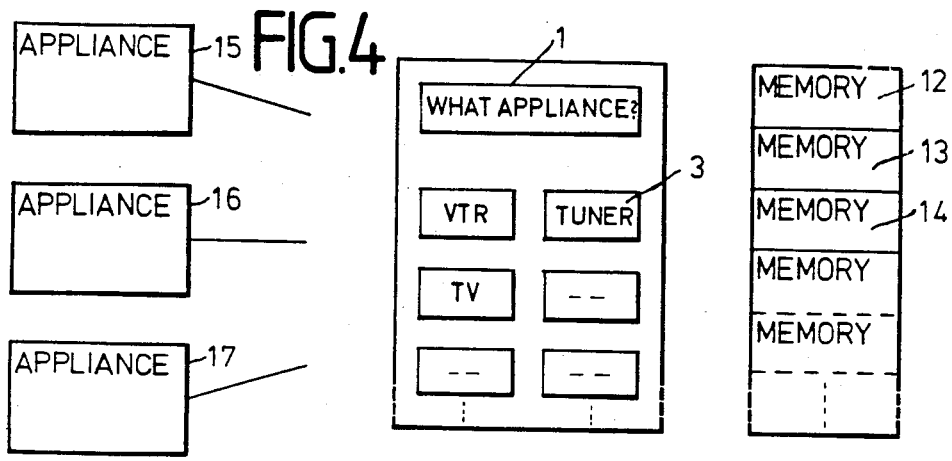
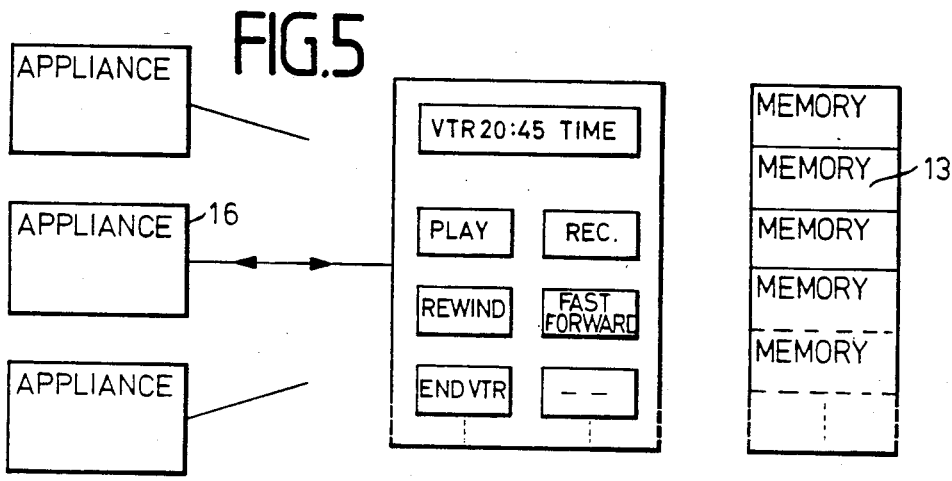
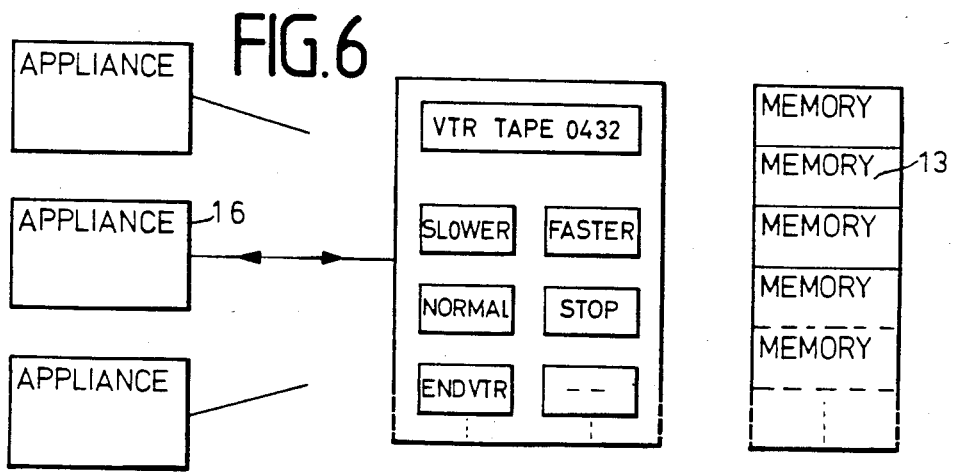

REMOTE CONTROL DEVICE FOR CONTROLLING VARIOUS FUNCTIONS OF ONE OR MORE APPLIANCES

BACKGROUND OF THE INVENTION

The present invention relates to a remote control device, particulary for controlling electrical and electronic household appliances, which can provide special operating instructions for each appliance to be controlled by using exchangeable memory elements. The remote control device is provided with keys and associated electronic display elements. The respective functions of the keys, as indicated by lettering or symbols displayed by the display elements, are controlled by digital circuitry or microprocessor according to the content of the exchangeable memory elements Known remote control devices are dedicated to the control of particular appliances, and the number of keys and legends for the keys are exclusively devoted to the control of the predetermined appliances. In such a remote control device with predetermined key functions and impressed lettering, substantial problems are inevitable if a rather complex appliance, for example a video recorder, is to be controlled or if a number of different appliances are to be controlled. The number of keys required is then usually so large that a convenient size for the remote control device can be attained only by giving keys multiple uses. However, this multiple key use makes it necessary to accommodate many keys having multiple imprinted or engraved legends in a small area, so that it is extremely difficult for the user to operate rhe remote control device.

Moreover, the known remote control devices mostly require that the user observe an indicator unit at the appliance to be operated during the use of the remote control device. Often, the user can detect only by observation of the reaction of the appliance being controlled that the depression of a key in the remote control device has indeed triggered the desired reaction in the appliance being controlled. Particularly when entering a time, for example when setting an electronic clock module in the appliance being controlled or entering switching times, it is frequently necessary to perform cyclic function advances (i.e. forward and backward switching controlled by the actuation of a key), which is impossible as a practical matter without observing the display at the appliance being controlled. However, the necessity of having to observe the remote controlled appliance, which is usually disposed at a distance, is inconsistent with the very idea of remote control and considerably reduces the utility of a remote control device.

SUMMARY OF THE INVENTION

The objects of the present invention are to simplify operation of a remote control device, to keep the number of keys or other operating elements at a minimum, to permit control of any desired number of appliances and many different appliances with the device, to free the user of various control tasks, and to permit operation without visual contact by the user with the appliance being controlled.

These and other objects are accomplished by providing a device which remotely controls various funcrions of one or more appliances by assigning functions to the keys in accordance with fixed rules applicable to the functions being controlled, and by providing appropriate legends for display on electronic display elements corresponding to the keys. This assignment of key functions and legends permits the user to make only decisions that conform to the fixed rules, thereby avoiding inappropriate user entries. The fixed rules, key functions, and legends are stored in exchangeable memory elements.

The remote control device may receive signals from a remotely controlled appliance in order to facilitate control or to confirm receipt of functional commands. In addition to the electronic display elements that provide legends for the corresponding keys, which may be provided in the form of transparent switch elements disposed over the corresponding display elements, the remote control device may include a further display element for giving operating instructions or information such as time to the user. An acoustic device may also be included to give audible operating instructions or other information. If desired the remote control device may be conveniently housed in a receptacle provided in the housing of a controlled appliance, so as to both replace the usual controls and permit remote operation.

The present invention can be used to advantage for all remote control tasks where the simplest possible key oriented control of a variety of appliances or a variety of functions in more complex devices is to be effected with one and the same remote control device.

BRIEF DESCRIPTION OF THE DRAWINGS

FIG. 1 shows a front elevational view of a remote control device according to an embodiment of present invention, including an electronic display element to give instructions to the user and 12 keys with associated electronic display elements to provide lettering identifying the current functions of the keys.

FIG. 2A is a view similar to that of FIG. 1 of a remote control device according to another embodiment of the present invention, wherein the keys are formed by a wire matrix embedded in a transparent lay-over foil.

FIG. 2B is a schematic representation of a representative key of the embodiment of FIG. 2A.

FIG. 4 is a representational illustration showing a remote control device according to the present invention with memory components for three appliances to be controlled in a moment before the user makes the actual decision of addressing a certain device by means of the remote control device.

FIG. 5 is a representational illustration showing the remote control device of FIG. 4 after the user has made a decision to address a video recorder by means of the remote control device.

FIG. 6 is a representational illustration showing the remote control device of FIGS. 4 and 5 after the "PLAY" key has been actuated.

DESCRIPTION OF THE PREFERRED EMBODIMENTS

Figure 3:
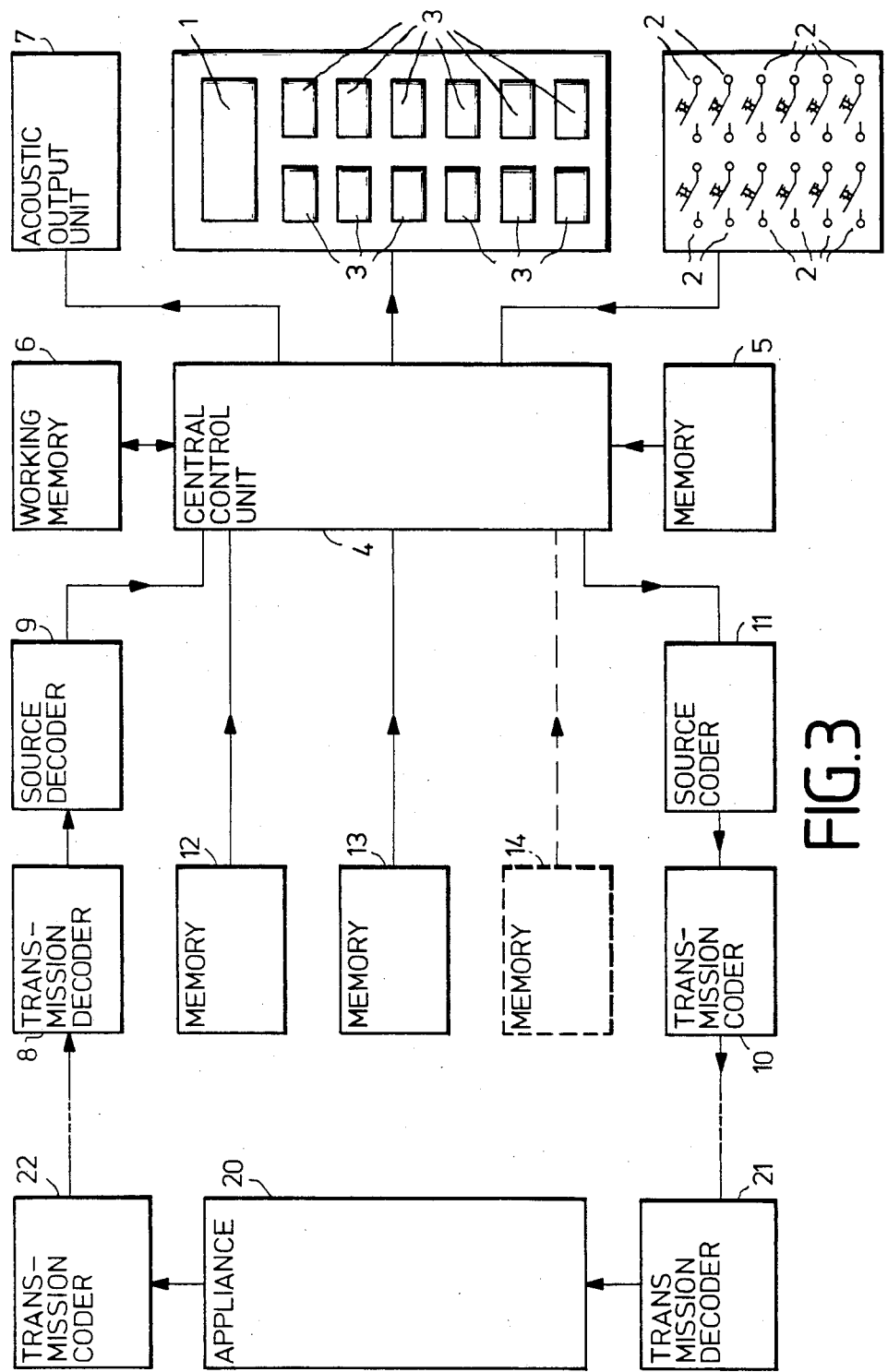
FIG. 3 is a block diagram of a basic electrical circuit for the remote control device according to the present invention.

FIG. 1 shows the front panel of a remote control device according to one embodiment of the present invention, including an information display element 1 to provide instructions for the user, twelve operating keys 2, and twelve associated display elements 3 on which the user is given the current function of the associated key by corresponding lettering such as words, abbreviations, or symbols. Display elements 1 and 3 may be of the liquid crystal or LED type. In an attempt to keep the number of keys as small as possible, the selection of twelve keys has a particular significance in that with twelve keys it is possible in a simple manner to enter a numeral between 0 and 9 as well as a number between 1 and 12. A decimal keyboard is needed for any calculating or counting operations in the decimal number system which may be encountered in a remote control system for home use. Typical examples include the entry of supply or consumption information (e.g., tape length) or numbering (e.g., selection or take number on a record, channel number, or the number of a self-defined function in a sequence of various functions). The twelve-key keyboard has been found to be of particular advantage in the use of any time input required for setting a clock, such as entering a turn-on or turn-off time in a time controlled switching system of the type encountered in many household appliances.

In the remote control device according to the present invention, the information display element 1 takes over, inter alia, the function of an interrogating element which confirms the data entered by the user. If, for example, in order to program a switching time, a starting time is to be entered, the question, "Starting time?", for example, would be formulated on information display element 1. At the same time, the keys would be lettered to correspond to possible reasonable answers. The user answers each time by selecting and then actuating only one of a maximum of twelve offered applicable keys. This process of selecting a key from a small number of keys each having a logically reasonable function must be considered to be a particularly useful way to operate a technical instrument, one with which any user is familiar.

FIG. 2A shows another embodiment of the remote control device according to the present invention. Here, keys 3 of FIG. 1 are provided in the form of pressure or contact sensitive transparent actuating elements which are placed over the respective display elements. Such actuating elements are known in various configurations, e.g. as crossed thin steel wires, embedded in transparent foils as illustrated in FIG. 2B.

FIG. 3 shows a functional block circuit diagram for the remote control device according to the present invention. Information display elements 1, keys 2, and electronic display elements 3 correspond to those described in connection with FIGS. 1 and 2. These elements, as all other function blocks, are connected with the central control unit 4 (e.g. a microprocessor). The instructions required for the basic operation of central control unit 4, e.g., the so-called operating system of the microprocessor, are stored in a memory element 5 (e.g. a ROM). Component 6 includes a working memory (e.g. a RAM) for the central control unit 4. An acoustic output unit 7 permits the microprocessor to provide acoustic warning or communication messages for the user in the form of signal tones or as a synthesized voice.

The instructions generated by the central control unit 4 corresponding to input from the user are coded by source coder 11 into signals which can be understood by the appliance involved (instruction messages). Such signals are then converted by transmission coder 10 into signals which can be transmitted to the appliance involved (shown in FIG. 3 by function blocks 20, 21, 22), e.g. infrared instruction messages. Transmission decoder 21 in the appliance being controlled converts such instruction messages, as is customary in known instruments, into the corresponding action of appliance 20. A further transmission coder 22 additionally transmits information back from the appliance being controlled to the remote control device through a so-called return channel. The corresponding signals are decoded in a transmission decoder 8 having an infrared sensitive photodiode input in the remote control device and are processed in a connected source decoder 9 for the central control unit 4.

As shown in FIG. 3, the central control unit 4 is additionally connected with a number of plug-in locations (only three are shown, but the number of these locations is not limited by the present invention) into which various memory elements 12, 13, and 14 can be interchangeably inserted. These memory elements contain operaring rules typical for each appliance to be remotely controlled, the words and symbols to be displayed in display elements 1 and 3, and the remote control codes for the appliances to be controlled in a form usable by central control unit 4. In the embodiment described here, these memory elements are ROMs or EPROMs.

FIGS. 4, 5 and 6 are simplified illustrations to provide an example of the functional principle of the remote control device according to the present invention. FIG. 4 shows the basic situation: in the plug-in locations, the remote control device according to the prerent invention is provided with the memory elements 12, 13, and 14 associated with appliances 15, 16 and 17 which are to be remotely controlled. The central control unit 4 of FIG. 3 recognizes from the content of the memory elements that in this configuration only the video recorder ("VTR"), radio receiver ("Tuner") and television receiver ("TV") appliances are to be operated. With the question "Which appliance?" only the possible answers of "VTR", "Tuner" and "TV" appear on keyboard display elements 3. All other display elements associated with the keys display dummy symbols from which the user can recognize that the missing legends are not caused by a defect in the circuit being actuated. After actuation of the key inscribed "VTR", the central control unit 4 branches off to the plug-in memory element 13, i.e., it designates key assignments and key functions or usages to correspond to the rules stored therein and uses, for the subsequently desired instruction transmitting signals to the associated appliance 16, only the rules for generating the respective instruction messages obtained likewise from memory element 13.

With the selection of the video recorder by actuation of the "VTR" key in FIG. 4, the legends for all keys change. FIG. 5 then shows the resulting state with the basic functions "Play", "Rec", "Rewind", "Fast Forward" and "End VTR" for the video recorder. That is, FIG. 5 illustrates the VCR appliance function controls which the user can actuate. The bidirectional transmission channel to video recorder 16 is used to transmit the instruction signals for controlling the video recorder as well as return information. In logical sequence, the content of the tape length counter, inter alia, which in the prior art devices is displayed at the appliance being remotely controlled, is displayed on the information display element 1 of the remote control device according to the present invention. FIG. 6 is a view of all displays after the "Play" key of FIG. 5 has been actuated. In this illustration the "Play" function control is an adjustable one, permitting the user to select "Play" actuation states such as "Normal," "Stop," "Faster," or "Slower."

From the foregoing discussion, one can see that the operating logic is organized in a logic tree structure, as it is known from other user guiding operating concepts.

Figure 7:
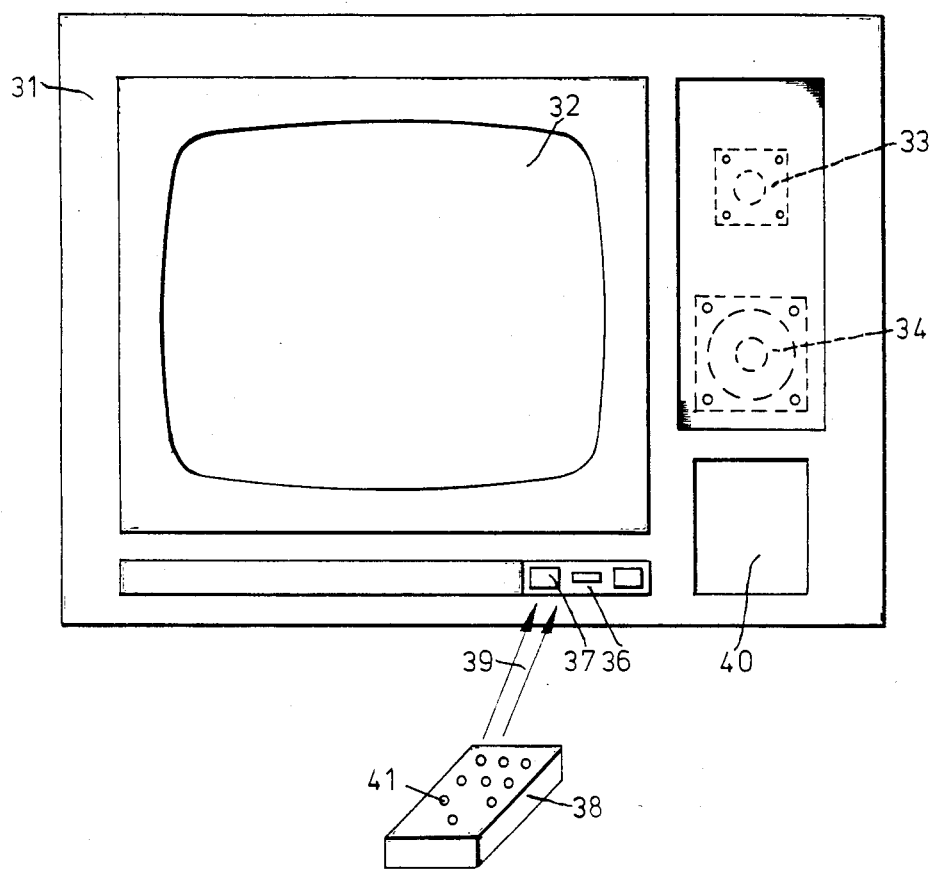
FIG. 7 is a front view of a television receiver with remote control.

FIG. 7 shows a television receiver 31 including a screen 32, high frequency loudspeaker 33, low frequency loudspeaker 34, main switch 36 and remote control receiver 37. Remote control unit 38, which transmits digital controls signals by way of infrared light beam 39, remotely controls television receiver 31 with respect to its functions. Remote control unit 38 includes operating and display elements 41. Television receiver 31 includes a receptacle 40 in the form of an open compartment which is empty in the In FIG. 7, only a single operating unit is employed which can selectively function as a remote control unit for the appliance and may also be an operating unit which is fixed to the appliance itself. The number of operating and display elements required as a whole can thus be cut practically in half.

Figure 8:
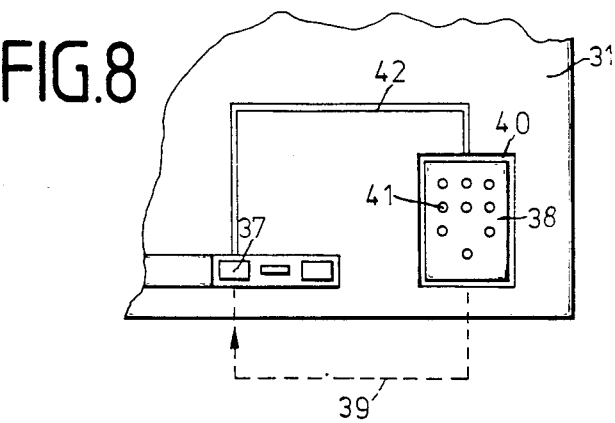
FIG. 8 is a front detail view of a portion of the television receiver of FIG. 7 with a remote control device housed in a recess to replace the usual television controls.

In FIG. 8, remote control unit 38 has been placed into receptacle 40 in such a manner that all elements 41 can be operated by the user and are visible. Remote control unit 38 now forms a stationary operating unit which is an integrated component of television receiver 31 in the same manner as a customarily fixedly installed operating panel.

The transmission of signals from remote control unit 38 to remote control receiver 37 can be effected in various ways. The arrangement may be such that, as shown in FIG. 7, remote control unit 38 transmits infrared light beams 39 which reach remote control receiver 37 outside the housing of television receiver 31. It is also possible to provide a cable of optical fibers 42 between the transmitter of the remote control unit 38 and the remote control receiver 37, as shown in FIG. 8 for use when unit 38 is stored in receptacle 40. In this way, the signals can also be transmitted over longer and complicated detours. The transmission of the signal from remote control unit 38 to remote control receiver 37 may also be effected via wires through plug-in connections. For example, a strip of plugs at remote control unit 38 can engage a corresponding strip of outlets in receptacle 40. With such a strip of plugs the remote control unit 38 can also be supplied with operating current from appliance 31.

Since practically all functions of television receiver 31 can be operated by means of remote control unit 38, the television receiver 31 itself need not have any, or possibly only a few, operating or display elements, e.g. a main switch for turning off the televison receiver 31.

Communication between the appliance and the remote control unit inserted in it may take place without wires or by means of a plug-in connection. A further advantage is that the remote control unit plugged into its receptacle in an appliance can receive its operating power from the appliance itself and thus save the batteries of the remote control unit. Also, with the remote control unit in this position, a battery provided in the remote control unit can be charged through the appliance by conductive or inductive energy transfer.

It will be understood that the above description of the present invention is susceptible to various modifications, changes and adaptations, and the same are intended to be comprehended within the meaning and range of equivalents of the appended claims.

What we claim is:

1. A remote control device for permitting a user thereof to control first and second appliances each having means for receiving information via a transmission channel, the first appliance additionally having a plurality of first appliance function controls which can be selectively actuated by the user to control the operation of the first appliance, with at least one of the first appliance function controls being an adjustable function control having a plurality of actuation states which can be selected to permit the user to select the manner in which the first appliance will execute the respective adjustable appliance function, the second appliance additionally having a plurality of second appliance function controls which can be selectively actuated by the user to control the operation of the second appliance, with at least one of the second appliance function controls being an adjustable function control having a plurality of actuation states which can be selected to permit the user to select the manner in which the appliance will execute the respective adjustable appliance function, said remote control device comprising:

a plurality of manually actuated keys;

a plurality of electronic display elements, each display element corresponding to a respective key;

remote control means communicating with said keys and display elements for permitting the user to select either appliance and operate the appliance function controls of the selected appliance, said remote control means including first means for assigning the first appliance to one key and displaying indicia identifying the first appliance on the respective display element, and for assigning the second appliance to another key and displaying indicia identifying the second appliance on the respective display element, second means for cancelling the assignment of the first means after the user has selected one of the appliances, and for thereafter assigning the appliance function controls of the selected appliance to respective keys and displaying indicia identifying these appliance function controls on the respective display elements, and third means for cancelling the assignment of the second means if the user selects an adjustable function control, and for thereafter assigning the actuation states of the selected adjustable function control to respective keys and displaying indicia identifying these actuation states on the respective display elements; and means operatively connected to the remote control means for generating coded signals and transmitting the signals over the transmision channel in response to manual actuation of the keys.

2. The remote control device of claim 1, wherein the first appliance is a video tape recorder, wherein the first appliance function controls include play, record, rewind, and fast-forward function controls, and wherein the play function control is an adjustable function control having at least normal and stop actuation states.

3. The remote control device of claim 1, wherein the keys do not exceed twelve in number.

4. The remote control device of claim 1, wherein the keys do not exceed six in number.

5. The remote control device of claim 1, wherein the remote control means comprises first exchangeable memory means for storing information concerning the first appliance and second exchangeable memory means for storing information concerning the second appliance.

6. The remote control device of claim 1, wherein the keys are transparent switch elements that are disposed over the corresponding display elements.

7. The remote control device of claim 1, wherein the first appliance has a receptacle therein for receiving the remote control device so that the user can operate the first appliance at either a position adjacent the first appliance, when the remote control device is in the receptacle, or a position remote from the first appliance when the remote control device is removed from the receptacle.

8. The remote control device of claim 7, wherein at least a portion of the transmission channel is devoid of conductors regardless of whether the remote control device is in the receptacle.

9. The remote control device of claim 7, further comprising means for receiving electrical power from the first appliance when the remote control device is in the receptacle.

10. A remote control device for permitting a user thereof to control predetermined functions of at least one appliance via a transmission channel, comprising:
a plurality of manually actuated keys;
a plurality of electronic display elements, each display element corresponding to a respective key;
control means communicating with asid keys and dispaly elements of assigning respective functions to the keys according to fixed rules applicable to the predetermined functions being controlled, and for displaying lettering identifying the assigned usages on the display elements corresponding to the keys; and
means operatively connected to the control means for generating a coded signal and transmitting such signal over the transmission channel in response to manual actuation of said keys,
wherein a requence having a predetermined number of may actuations is needed to control at least one of the predetermined functions and wherein the set of all possible sequences of the predetermined number of key actuations includes both sequences that are sufficient for controlling said at least óne of the predetermined functions and sequences that are insufficient for controlling said at least one of the predetermined functions, and wherein said control means further comprises means for storing signals corresponding to key actuations and for permitting generation of said coded signal and transmission thereof over said transmission channel only if a sequence that is sufficient for controlling said at least one predetermined function has been completed.

11. A remote control device for permitting a user thereof to control predetermined functions of at least one appliance via a transmission channel, comprising:
a plurality of manually actuated keys;
a plurality of electronic display areas, each display area corresponding to a respective key;
control means communicating with said keys and display areas for assigning respective functions to the keys according to fixed rules applicable to the predetermined functions being controlled, and for displaying lettering identifying the assigned usages on the display areas corresponding to the keys; and
means operatively connected to the control means for generating a coded signal and transmitting such signal over the transmission channel in response to manual actuation of said keys,
wherein a sequence having a predetermined number of key actuations is needed to control at least one of the predetermined functions and wherein the set of all possible sequences of the predetermined number of key actuations includes both sequences that are sufficient for controlling said at least one of the predetermined functions and sequences that are insufficient for controlling said at least one of the predetermined functions, and wherein said control means further comprises means for storing signals corresponding to key actuations and for permitting generation of said coded signal and transmission thereof over said transmission channel only if a sequence that is sufficient for controlling said at least one predetermined function has been completed.

* * * * *